June 13, 1950     H. L. PETRI     2,511,808
SNAP-IN FASTENER FOR CHANNELED MEMBERS
Filed July 13, 1946
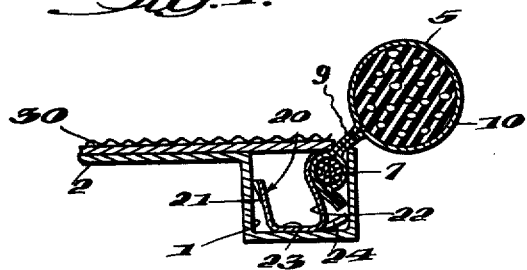
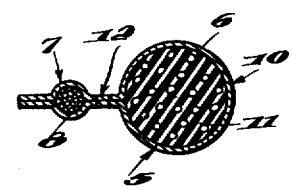
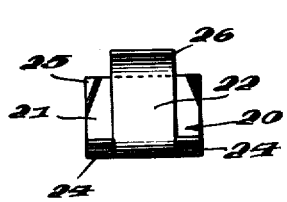
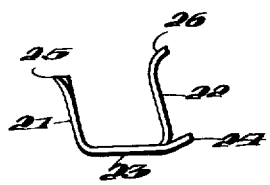
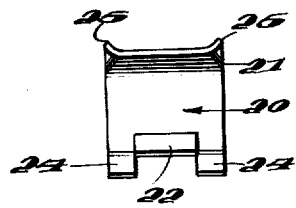
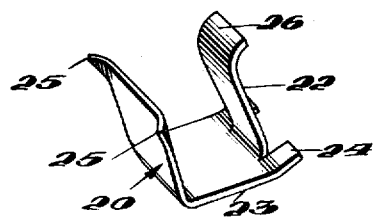
Inventor
HENRY L. PETRI,
By John Todd
Attorney Patented June 13, 1950

2,511,808

UNITED STATES PATENT OFFICE 2,511,808

SNAP-IN FASTENER FOR CHANNELED MEMBERS

Henry L. Petri, Detroit, Mich., assignor to United-Carr Fastener Corporation, Cambridge, Mass., a corporation of Massachusetts Application July 13, 1946, Serial No. 683,522

2 Claims. (Cl. 24—259)

The present invention relates to upholstery trim installations such as upholstery trim installations for motor vehicle bodies and the fasteners therefor, and aims generally to improve both the installations and the fastener means.

One existing practice in motor vehicle body construction is to provide a wooden nailing strip mounted in a channel on the car body, to which a trim board or wind cord is secured. Such prior practice requires the shaping and fitting of the nailing strip into the channel of the car body and the accurate positioning and tacking of the trim or wind cord to the nailing strip prior to the application of the trim panel.

One of the primary objects of the present invention is the provision of an improved upholstery trim installation that will eliminate the necessity of the tacking strip.

A further object of the invention is the provision of a trim installation including a trim cord of novel construction that may be readily and accurately positioned in a channel of a supporting body, for example, a car body panel.

A still further object of the invention is the provision of an improved fastener member adapted to be readily locked in a channel-shaped support and secured to a trim member in accurate predetermined relation with respect to an edge thereof.

The above and other objects of the invention will be apparent to persons skilled in the art from a consideration of the accompanying drawings and annexed specification illustrating and describing a preferred form of the invention.

In the drawing—

Fig. 1 is an enlarged transverse sectional view of a typical installation embodying the invention;

Fig. 2 is an enlarged cross sectional view of a typical trim member according to the present invention;

Fig. 3 is a front elevation of the improved fastener member according to the invention;

Fig. 4 is an edge elevation of the improved fastener member shown in Fig. 3;

Fig 5 is a top plan view of the improved fastener member shown in Figs. 3 and 4; and Fig. 6 is a perspective thereof.

Referring to the drawings, the upholstery trim is designed to be mounted in a channel 1 of a supporting member 2, which may be a body panel of a motor vehicle body, for example a car roof panel or side panel. Such panels 2, per se, are of a well known type, and the channel 1 is disposed along one edge thereof and is usually fitted with a wooden nailing or tacking strip to which a fabric trim member is tacked.

According to the present invention, a trim installation is provided in which the conventional nailing or tacking strip is not employed and wherein a trim member of novel design is accurately secured within the channel 1 of the supporting panel 2.

The trim member 5, according to the invention, may be a continuous length of suitable material, for example a strip 6 of textile fabric, of predetermined width and provided with an anchoring bead 7 along one edge thereof. The anchoring bead 7 may be conveniently formed by folding the fabric 6 around a cord 8 or the like and stitching opposed layers of the fabric together as at 9. The opposite edge of the trim 5 may be suitably shaped to provide the trim desired. In the illustrated embodiment shown, the outer edge of the strip is constructed to provide a wind bead 10, and may be formed by folding the fabric 6 around a bead 11 of resilient material, for example, sponge rubber.

The trim 5 is characterized by being of predetermined width having an anchoring bead along one edge thereof. When the outer edge of the trim is in the form of a wind bead 10 as shown, it is spaced from the anchoring bead 7 by a reduced neck portion 12 of predetermined width which constitutes a swingable flap connecting the two.

The trim member 5 is securely fastened in the channel 1 of the support 2 by means of fastener members adapted for snap fastening locking engagement with the opposed side or flanges of the channel and are of such design as to embrace the anchoring bead 7 of the trim member 5 and secure it in a predetermined position with reference to the marginal edge of the support.

Preferably the fastener members 20, see Figs. 3, 4 and 5, comprise a substantially U-shaped member adapted to be snapped into locking engagement with the flanges and web of the channel 1. The U-shaped fastener preferably comprises a support-engaging leg 21 and a trim-engaging leg 22, the latter being of less width than the leg 21 and hence more resilient. The bight portion 23 of the fastener 20 is adapted to bear against the web of the channel 1 and is formed with laterally external support-engaging fingers 24 on opposite sides of the trim-engaging leg 22 adapted to be disposed substantially normal to a flange of the channel 1 for locking engagement therewith. The outer end of the leg 21 may be outwardly turned to provide teeth 25 adapted to bite into and grip more securely the material of the channel flange.

The fastener member 20 is securely retained in locked engagement with the opposed parallel flanges of the channel 1 by reason of the engagement of the fingers 24 and teeth 25 on the end of the leg 21. The leg 21 and the bight portion 23 with its extensions 24 constitute relatively resilient parts disposed substantially at right angles to each other, permitting the fastener to be readily inserted in the channel but effectively resisting any tendency to dislodgement therefrom.

The terminal end of the trim-engaging leg may be outwardly curved as at 26 or otherwise suitably shaped to overlie a portion of the anchoring bead 7 of the trim 5. As the leg 22 is laterally resilient, it will clamp the anchoring bead 7 of the trim against the adjacent flange of the support channel 1. As will be apparent, when the fastener is fully inserted in the channel 1 with the bight portion 23 engaging the work of the channel, the curved end 26 of the trim-engaging leg 22 will hold the trim in a predetermined position relative to a longitudinal edge of the support 1.

In assembling the trim installation, the trim 5 is laid along an edge of the channel, substantially as shown in Fig. 1, and is tacked in place by a plurality of fasteners 20 at spaced points along the channel. When the fasteners are fully seated in the channel 1, the curved end 26 of the trim-engaging leg 22 serves as a limit stop for the anchoring bead of the trim. The trim may then be pulled outwardly so that the bead 7 engages the curved ends 26, thus insuring the desired predetermined alignment of the trim with the longitudinal edge of the support. Thereafter a trim panel 30 may be secured to the support so as to overlie the channel 1 as shown in Fig. 1.

It will be readily appreciated by persons skilled in the art that the present invention provides simple, efficient, and economical upholstery trim installations that may be quickly assembled with a minimum of labor. The elimination of the conventional wooden tacking strip lowers the cost of the installation as well as reduces the time required for assembly.

Although I have illustrated a preferred form of fastener embodying the invention, I do not intend to be limited to the precise details thereof as the scope of the invention is best defined in the appended claims.

I claim:

1. A fastener for securing a part between opposite flanges of a channel-shaped support comprising a substantially U-shaped member having opposed leg portions connected by a bight portion and adapted to be snapped into locking engagement with said channel-shaped support with the bight portion thereof disposed opposite the web of the support and the leg portions thereof disposed opposite the opposed flanges of the support, one of said leg portions having outwardly extending means adjacent the free end thereof for biting engagement with one of the opposed flanges of the channel-shaped support, the other of said leg portions forming a resilient means for engaging and holding a part between said leg portion and the other of said opposed flanges, and a support-gripping means extending outwardly from said bight portion for biting engagement with said other flange.

2. A fastener for securing a part between opposite flanges of a channel-shaped support comprising a substantially U-shaped member having opposed leg portions connected by a bight portion and adapted to be snapped into locking engagement with said channel-shaped support with the bight portion thereof disposed opposite the web of the support and the leg portions thereof disposed opposite the opposed flanges of the support, one of said leg portions having the ends thereof turned outwardly to provide teeth adapted to bite into and securely grip the material of one of the channel flanges, the other of said leg portions forming a resilient means for engaging and holding a part between said leg portion and the other of said opposed flanges, and support-gripping means extending outwardly from said bight portion on opposite sides of said other leg portion for biting engagement with said other flange.

HENRY L. PETRI.

REFERENCES CITED

The following references are of record in the file of this patent:

UNITED STATES PATENTS

| Number | Name | Date |
| --- | --- | --- |
| 1,872,149 | Ledwinka | Aug. 16, 1932 |
| 2,109,213 | Fearing | Feb. 22, 1938 |
| 2,166,889 | Churchill | July 18, 1939 |
| 2,216,219 | Wiley | Oct. 1, 1940 |
| 2,234,136 | Barr | Mar. 4, 1941 |
| 2,345,004 | Place | Mar. 28, 1944 |